(12) United States Patent
Kim et al.

(10) Patent No.: US 7,394,825 B2
(45) Date of Patent: Jul. 1, 2008

(54) 10-GIGABIT ETHERNET LINE INTERFACE APPARATUS AND METHOD OF CONTROLLING THE SAME

(75) Inventors: Do Yeon Kim, Daejeon (KR); Sang Min Lee, Daejeon (KR); Chang Ho Choi, Daejeon (KR); Sung Soo Kang, Daejeon (KR); Hae Won Jung, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 955 days.

(21) Appl. No.: 10/441,517

(22) Filed: May 20, 2003

(65) Prior Publication Data

US 2004/0109465 A1 Jun. 10, 2004

(30) Foreign Application Priority Data

Dec. 10, 2002 (KR) .................. 10-2002-0078173

(51) Int. Cl.
*H04J 3/16* (2006.01)
(52) U.S. Cl. ..................... 370/466; 370/535
(58) Field of Classification Search ............... 370/419, 370/463, 465, 466, 467, 469, 535, 537
See application file for complete search history.

(56) References Cited

U.S. PATENT DOCUMENTS

| | | | | |
|---|---|---|---|---|
| 5,940,598 A * | 8/1999 | Strauss et al. | ............... | 709/249 |
| 6,424,636 B1 * | 7/2002 | Seazholtz et al. | ........... | 370/295 |
| 6,442,137 B1 | 8/2002 | Yu et al. | | |
| 6,771,671 B1 * | 8/2004 | Fields et al. | ................. | 370/514 |
| 7,133,416 B1 * | 11/2006 | Chamdani et al. | ........... | 370/466 |
| 7,164,692 B2 * | 1/2007 | Cox et al. | ................... | 370/466 |
| 2001/0014104 A1 * | 8/2001 | Bottorff et al. | ............... | 370/471 |
| 2001/0030971 A1 * | 10/2001 | Moody | ....................... | 370/401 |
| 2002/0126709 A1 * | 9/2002 | Lauder et al. | ................ | 370/535 |
| 2003/0026298 A1 * | 2/2003 | Bisson et al. | ................ | 370/537 |
| 2004/0028075 A1 * | 2/2004 | Nejad et al. | ................. | 370/463 |
| 2004/0114638 A1 * | 6/2004 | Matsuura et al. | ............ | 370/537 |

FOREIGN PATENT DOCUMENTS

EP 1 124 355 A2 8/2001

OTHER PUBLICATIONS

Development of the 10 Gigabit Ethernet Edge Switch, 5 pages, section no update.

* cited by examiner

*Primary Examiner*—Ricky Q. Ngo
*Assistant Examiner*—Kan Yuen
(74) *Attorney, Agent, or Firm*—Blakely, Sokoloff, Taylor & Zafman LLP (57) ABSTRACT

Disclosed herein is a 10-gigabit Ethernet line interface apparatus and method of controlling the same. The apparatus has N network processors, a frame multiplexing and demultiplexing block, a 10-gigabit extender sublayer processing block, a 10-gigabit Ethernet physical layer processing block, a 10-gigabit physical layer control logic, a line interface control logic, and a line processor. The N network processors are connected to the switch fabric unit. The frame multiplexing and demultiplexing block provides GMII and XGMII between the N network processors and a 10-gigabit extender sublayer processing block. The present invention can improve transmission speed and packet processing performance of a physical layer to a 10 Gbps level while maintaining basic frame standards of a 1-gigabit Ethernet switch apparatus.

2 Claims, 5 Drawing Sheets

10-GIGABIT ETHERNET LINE INTERFACE APPARATUS AND METHOD OF CONTROLLING THE SAME

BACKGROUND OF THE INVENTION

1. Field of the Invention

The present invention relates generally to a 10-gigabit Ethernet line interface apparatus and method of controlling the same, which can maintain compatibility with other gigabit Ethernet technologies and improve the transmission and packet processing speed of a physical layer to a 10-gigabit per second level by maintaining basic frame standards, such as the sizes of minimum and maximum frames and inter frame gap.

2. Description of the Prior Art

A conventional gigabit Ethernet switch apparatus has been operated as a layer 2 Ethernet switch apparatus that allows a backbone system for interfacing all Ethernet ports at a speed of 1-gigabit per second (Gbps) and an edge system for interfacing ports between backbone systems at a speed of 1 Gbps and interfacing ports between a plurality of servers or hubs at a speed of 100-megabit per second (Mbps) to be constructed into a Local Area Network (LAN).

However, as the number of users utilizing various applications increases, the amount of traffic on the Internet and Intranet increases, so a gigabit-level desktop or server computer has been introduced. Further, data traffic on an internal network of a campus or local network between buildings increases, so a 10-gigabit Ethernet edge switch apparatus is required to interface ports between plural servers or hubs at a speed of 1 Gbps and interface ports between backbone systems at a speed of 10 Gbps.

However, a conventional 1-gigabit Ethernet switch apparatus cannot provide a speed of 10 Gbps.

Further, some communication equipment companies invest a lot of money to independently develop packet processors capable of processing 10-gigabit Ethernet packets in the form of an Application Specific Integrated Circuit (ASIC), and market the packet processors. The packet processors developed in such a way are problematic in that, since they are dependent upon products manufactured by the companies which developed the packet processors, they do not have generality, and system costs increase due to the burden of development costs.

As a result, methods and apparatuses for improving 10-gigabit Ethernet technologies complying with Institute of Electrical and Electronics Engineers (IEEE) 802.3ae standards have recently been proposed. One of them is disclosed in European Patent EP 1 124,355 A2, applied by Nortel Networks Corp., and registered in August 2001. In this patent, there is disclosed a method of providing a mapping function for a common interface between Local Area Network (LAN) and Wide Area Network (WAN) so as to transmit high-speed Ethernet data streams with a data speed of 10 Gbps through a synchronous packet switch network, such as standard SONET OC-192 with a line speed of 9.953280 Gbaud, in MAC and physical layer functions. However, the patent provides only a mapping function between physical layers of the LAN and WAN, but cannot provide layer 2 (L2) switching and layer 3 (L3) routing functions between a plurality of 1-gigabit ports and a single 10-gigabit port.

SUMMARY OF THE INVENTION

Accordingly, the present invention has been made keeping in mind the above problems occurring in the prior art, and an object of the present invention is to provide a 10-gigabit Ethernet line interface apparatus and method of controlling the same, which improves the transmission speed and packet processing performance of a physical layer to a 10 Gbps level while maintaining the basic frame standards of a 1-gigabit Ethernet switch apparatus.

Another object of the present invention is to provide a 10-gigabit Ethernet line interface apparatus and method of controlling the same, which can provide layer 2 (L2) switching and layer 3 (L3) routing functions for 1-gigabit Ethernet frames and 10-gigabit Ethernet frames.

In order to accomplish the above object, the present invention provides a 10-gigabit Ethernet line interface apparatus, the line interface apparatus being connected to a 10-gigabit Ethernet line of a 10-gigabit Ethernet edge switch, the 10-gigabit Ethernet edge switch having 1-gigabit Ethernet line interface units connected to m 1-gigabit lines, a switch fabric unit, and a main processor unit, comprising N network processors connected to the switch fabric unit; a frame multiplexing and demultiplexing block for providing 1-gigabit Ethernet standard interfaces GMII (1-gigabit Media Independent Interface) and a 10-gigabit Ethernet standard interface XGMII(10-gigabit Media Independent Interface) between the N network processors and the 10-gigabit extender sublayer processing block; a 10-gigabit extender sublayer processing block connected to the frame multiplexing and demultiplexing block for supporting XGMII and XAUI (10-gigabit Attachment Unit Interface) and extending transmission distance of 10-gigabit data; a 10-gigabit Ethernet physical layer processing block implemented by a standard package optical module to support 10-gigabit optical interfaces; a 10-gigabit physical layer control block for controlling the 10-gigabit extender sublayer processing block and the 10-gigabit Ethernet physical layer processing block; a line interface control block for controlling the 10-gigabit Ethernet line interface apparatus; and a line processor for performing an IPC (Inter-Processor Communication) function to exchange control and status information with the main processor unit, drive the N network processors, and perform forwarding table management and traffic management functions.

Preferably, in the 10-gigabit Ethernet line interface apparatus, the frame multiplexing and demultiplexing block divides an internal memory into M section buffers, each with a size of M1 bytes; and the frame multiplexing and demultiplexing block is operated such that, at a time of multiplexing, it sequentially multiplexes frames received from the N network processors and stored in the M section buffers according to n GMII ports, converts the frames to data for the XGMII standard interface, and transfers the data to the 10-gigabit Ethernet physical layer processing block.

Preferably, the frame multiplexing and demultiplexing block is operated such that, at a time of demultiplexing, the frame multiplexing and demultiplexing block recognizes an L2/L3 set status of a 10-gigabit port; and if the 10-gigabit port is set to an L2 port, the frame multiplexing and demultiplexing block compares a destination address DA (t) and a source address SA (t) of a frame currently received from the 10-gigabit port with a destination address DA (t-1) and a source address SA (t-1) of a previously received frame, respectively, and stores the received frame in a reference section buffer in which the previously received (t-1) frame is stored so as to guarantee frame sequence in the case where the addresses are the same, and sequentially stores the received frame in a section buffer next to the reference section buffer in the case where the addresses are different; and the frame multiplexing and demultiplexing block calculates a frame size of every frame received by the reference section buffer from the 10-gigabit port and sequentially stores even frames, which are to be stored in the same reference section buffer, in the next section buffer so as to prevent loss of frames, if the frame size exceeds a size of an allocated section buffer.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
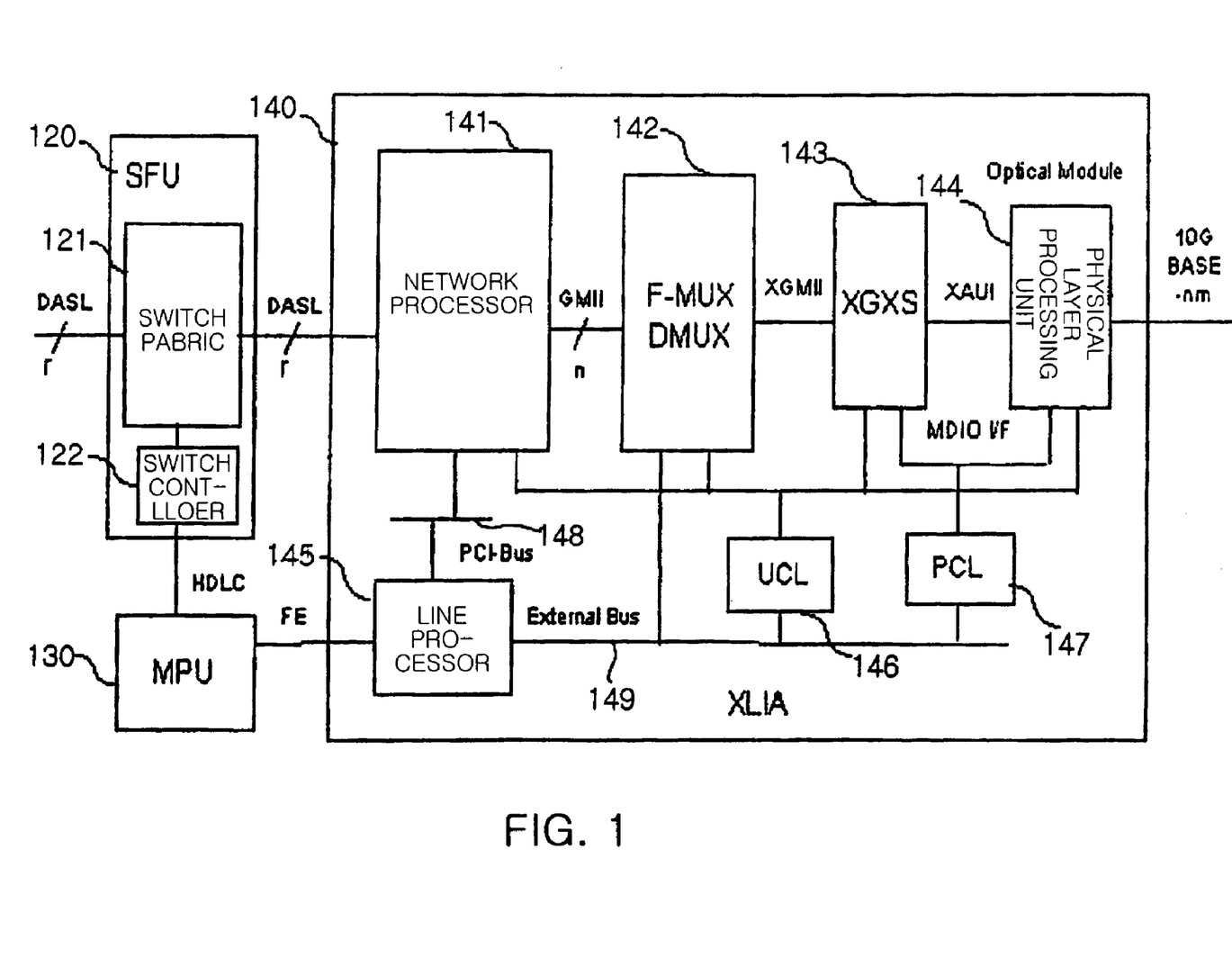
FIG. 1 is a block diagram showing an entire construction of a 10-gigabit Ethernet edge switch to which the present invention is applied.

FIG. 1 is a block diagram showing an entire construction of a 10-gigabit Ethernet edge switch to which the present invention is applied. As shown in FIG. 1, the 10-gigabit Ethernet edge switch comprises a plurality of 1-gigabit Ethernet Line Interface Units (GLIUs) 111 and 112, a switch fabric unit 120, a main processor unit 130 and a 10-gigabit Ethernet line interface apparatus 140.

In FIG. 1, each of the 1-gigabit Ethernet line interface units 111 and 112 comprises a physical layer processing block 113, R-gigabit network processors 114 and a line processor 115.

The line processor 115 initializes and controls the N network processors 114 through a Parallel Component Interface (PCI) bus.

Further, the physical layer processing block 113 converts optical signals received from a 1-gigabit Ethernet network to electrical signals, and transfers streams converted to the electrical signals to the network processors 114 through a Ten Bit Interface (TBI). On the contrary, the physical layer processing block 113 receives streams from the network processors 114, converts the streams to optical signals, and transmits the optical signals to the 1-gigabit Ethernet network.

Each of the network processors 114 decodes 10-bit streams received from the physical layer processing block 113 to 8-bit streams to extract Ethernet frames from the 8-bit streams, performs L2 switching and L3 routing functions with respect to the extracted frames (or packets), and then transfers fixed packet cells with switch port information attached thereto to the switch fabric unit 120 through a Data-Aligned Synchronous Link (DASL). Further, each of the network processors 114 receives fixed packet cells from the switch fabric unit 120, generates 1-gigabit Ethernet frames using the fixed packet cells, and transmits the 1-gigabit Ethernet frames to the physical layer processing block 113.

The line processor 115 performs an Inter-Processor Communication (IPC) function together with the main processor unit 130 to exchange control and status information with the main processor unit 130, initialize and drive the network processors 114, and perform forwarding table management and traffic management functions for L2 and L3 functions in connection with the main processor unit 130.

The switch fabric unit 120 includes a switch fabric 121 for receiving packets from the 1-gigabit Ethernet line interface units 111 and 112 and the 10-gigabit Ethernet line interface apparatus 140 and transferring the packets to destination line interface units, and a switch controller 122 for controlling the switch fabric unit 120.

Further, the main processor unit 130, which provides initialization and operating management functions and L2/L3 protocols of the 10-gigabit Ethernet edge switch, includes a main processor 131 and an IPC processing block 132.

Figure 2:
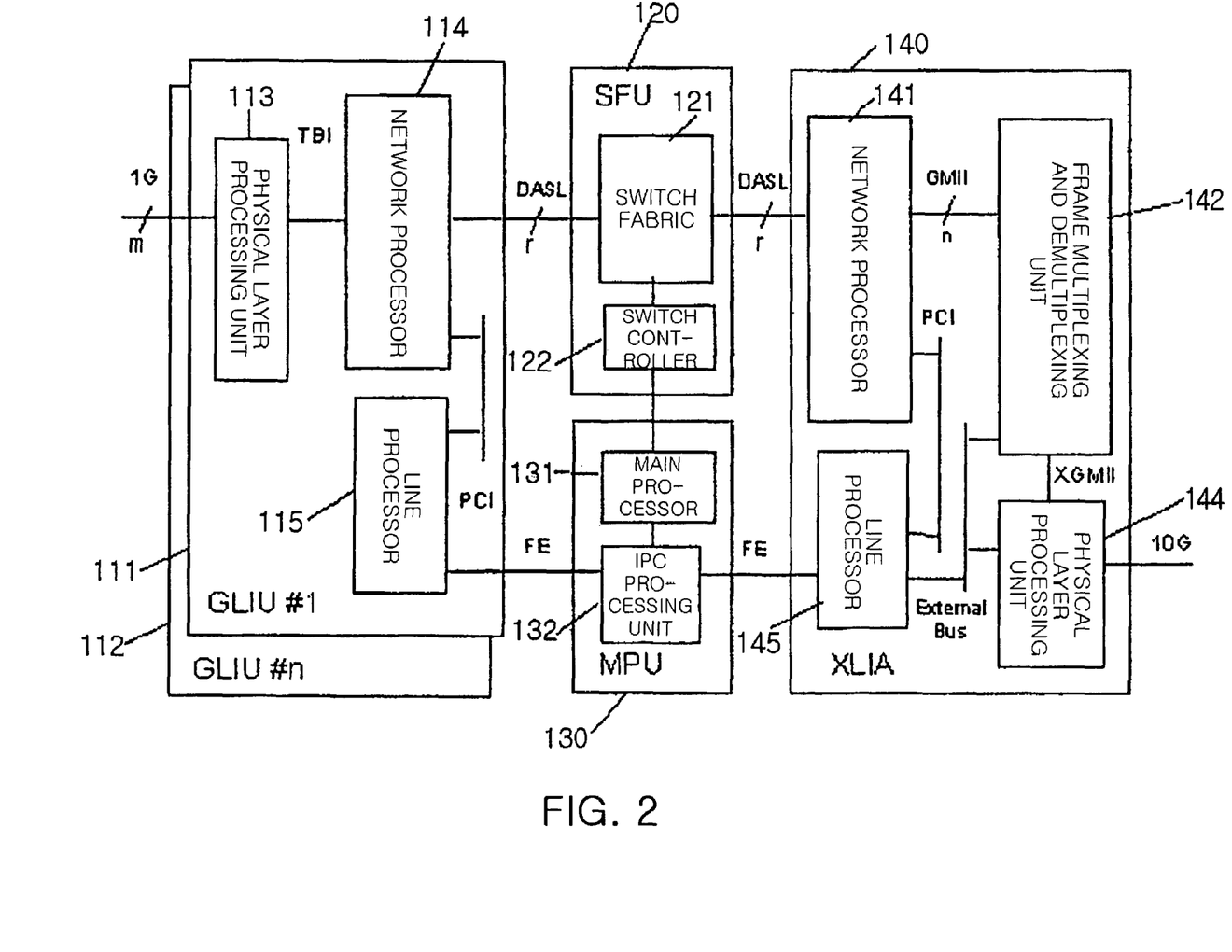
FIG. 2 is a block diagram of a 10-gigabit Ethernet line interface apparatus according to the present invention.

FIG. 2 is a detailed block diagram of the 10-gigabit Ethernet line interface apparatus according to the present invention. The 10-gigabit Ethernet line interface apparatus 140 comprises N R-gigabit network processors 141, a frame multiplexing and demultiplexing block 142, a 10-gigabit Extender Sublayer (XGXS) processing block 143, a 10-gigabit Ethernet physical layer processing block 144, a line processor 145, a line interface control logic 146, and a physical layer control logic 147. The frame multiplexing and demultiplexing block 142 multiplexes and demultiplexes frames in conformity with Gigabit Media Independent Interface (GMII), which is a gigabit Ethernet standard interface, and 10 Gigabit Media Independent Interface (XGMII) which is a 10-gigabit Ethernet standard interface. The XGXS processing block 143 converts XGMII to 10 Gigabit Attachment Unit Interface (XAUI) or converts XAUI to XGMII so as to extend data transmission distance. The 10-gigabit Ethernet physical layer processing block 144 is implemented by a 10-gigabit Ethernet Package (XENPAK) module which is a standard package optical module so as to support various 10-gigabit optical interfaces. The line processor 145 controls the network processors 141 by performing an IPC function together with the main processor unit 130. The line interface control logic 146 controls the 10-gigabit Ethernet line interface apparatus 140. The physical layer control logic 147 controls the XGXS processing block 143 and the physical layer processing block 144.

The line processor 145 initializes and controls the N network processors 141 through a PCI bus 148.

The physical layer processing block 144 implemented by the XENPAK optical module receives optical signals from a 10-gigabit Ethernet network. The physical layer processing block 144 has a 10 GBASE-X 8B/10B Physical Coding Sublayer (PCS) function and a Physical Medium Attachment (PMA) function for interface with the XGXS processing block 143, and provides a 64B/66B PCS function, a series PMA function, and a Physical Medium Dependent (PMD) function so as to provide the 10 gigabit standard interface.

The XGXS processing block 143 provides an XGMII interface function while extending the transmission distance of electrical signals on a Printed Circuit Board (PCB), codes data using 8B/10B coding, and transmits the coded data to respective lanes.

The frame multiplexing and demultiplexing block 142 receives m 1-gigabit Ethernet frames from the N network processors 141 through n gigabit standard interfaces GMII, converts the m 1-gigabit Ethernet frames to 10-gigabit Ethernet frames, and transmits the 10-gigabit Ethernet frames through the 10-gigabit standard interface XGMII. The frame multiplexing and demultiplexing block 142 also provides a function contrary to the above function. The frame multiplexing and demultiplexing block 142 divides an internal buffer having a Field Programmable Gate Array (FPGA) architecture into M section buffers each with the size of MI bytes and controls the M section buffers according to CMII ports. That is, at the time of multiplexing, the frame multiplexing and demultiplexing block 142 multiplexes frames stored in the M section buffers at a speed of 10 Gbps. Further, at the time of demultiplexing, the frame multiplexing and demultiplexing block 142 recognizes an L2/L3 set status of a 10-gigabit port. That is, if the 10-gigabit port is set to a Layer 2 (L2) port, the frame multiplexing and demultiplexing block 142 compares a destination address DA (t) and a source address SA (t) of a current frame, which are Media Access Control (MAC) addresses, with a destination address DA (t-1) and a source address SA (t-1) of a previous frame, respectively, and stores the received frame in the same section buffer as the previous (t-1) frame is stored so as to guarantee frame sequence if the addresses are the same. On the contrary, if the addresses are different, the frame multiplexing and demultiplexing block 142 sequentially stores the received frame in a section buffer next to the section buffer. Further, the frame multiplexing and demultiplexing block 142 calculates a frame size of every received frame, and sequentially stores the received frame in a section buffer next to a corresponding section buffer if a frame size exceeds the size of an allocated section buffer. Further, if the 10-gigabit port is set to layer 3 (L3) port, the frame multiplexing and demultiplexing block 142 compares a destination address DA of a frame header with a MAC address allocated to the 10-gigabit port, and discards a received frame if the addresses are not the same. Further, if the addresses are the same, the frame multiplexing and demultiplexing block 142 compares a Destination Internet Protocol (IP) address DIP (t) and a Source IP address SIP (t) of a current packet with addresses DIP (t-1) and SIP (t-1) of a previous packet, respectively, and stores the received packet in the same section buffer as the previous packet is stored so as to guarantee packet sequence if the IP addresses are the same. On the contrary, if the IP addresses are different, the frame multiplexing and demultiplexing block 142 sequentially stores the received packet in a section buffer next to the section buffer. Further, the frame multiplexing and demultiplexing block 142 calculates an IP packet size of every received IP packet, and sequentially stores the received IP packet in a section buffer next to a corresponding section buffer if the IP packet size exceeds the size of buffer allocated for port memory.

The network processors 141 receive frames stored in the M section buffers in the frame multiplexing and demultiplexing block 142 in parallel through the GMII interfaces, extract frames from received 8-bit streams, and perform a Cyclic Redundancy Check (CRC). At this time, if an error does not exist in the frames on the basis of CRC results, the network processors 141 perform packet recognition and classification functions, address lookup and forwarding functions and a traffic management function for L2 switching and L3 routing operations with respect to the extracted packets, and transmit fixed packet cells with switching port information attached thereto to the switch fabric unit 120 through a Data-Aligned Synchronous Link (DASL) interface. On the contrary, the network processors 141 receive fixed packet cells from the switch fabric unit 120, generate 1-gigabit Ethernet frames using the fixed packet cells and transmit the 1-gigabit Ethernet frames to the frame multiplexing and demultiplexing block 142.

Next, the line processor 145 performs an IPC function together with the main processor unit 130 to exchange control and status information with the main processor unit 130, initialize and drive the network processors 141, and perform forwarding table management and traffic management for L2 and L3 functions in connection with the main processor unit 130.

Further, the line processor 145 controls and monitors the physical layer processing block 144, and provides the controlled and monitored results to the main processor unit 130.

Especially, the 10-gigabit Ethernet line interface apparatus 140 according to the present invention is comprised of the N network processors 141, so the main processor unit 130 equally sends static L2 and L3 forwarding tables and dynamic L2 and L3 forwarding tables to the N network processors 141 as the same information, thus increasing packet forwarding performance to a 10 Gbps level.

Figure 3:
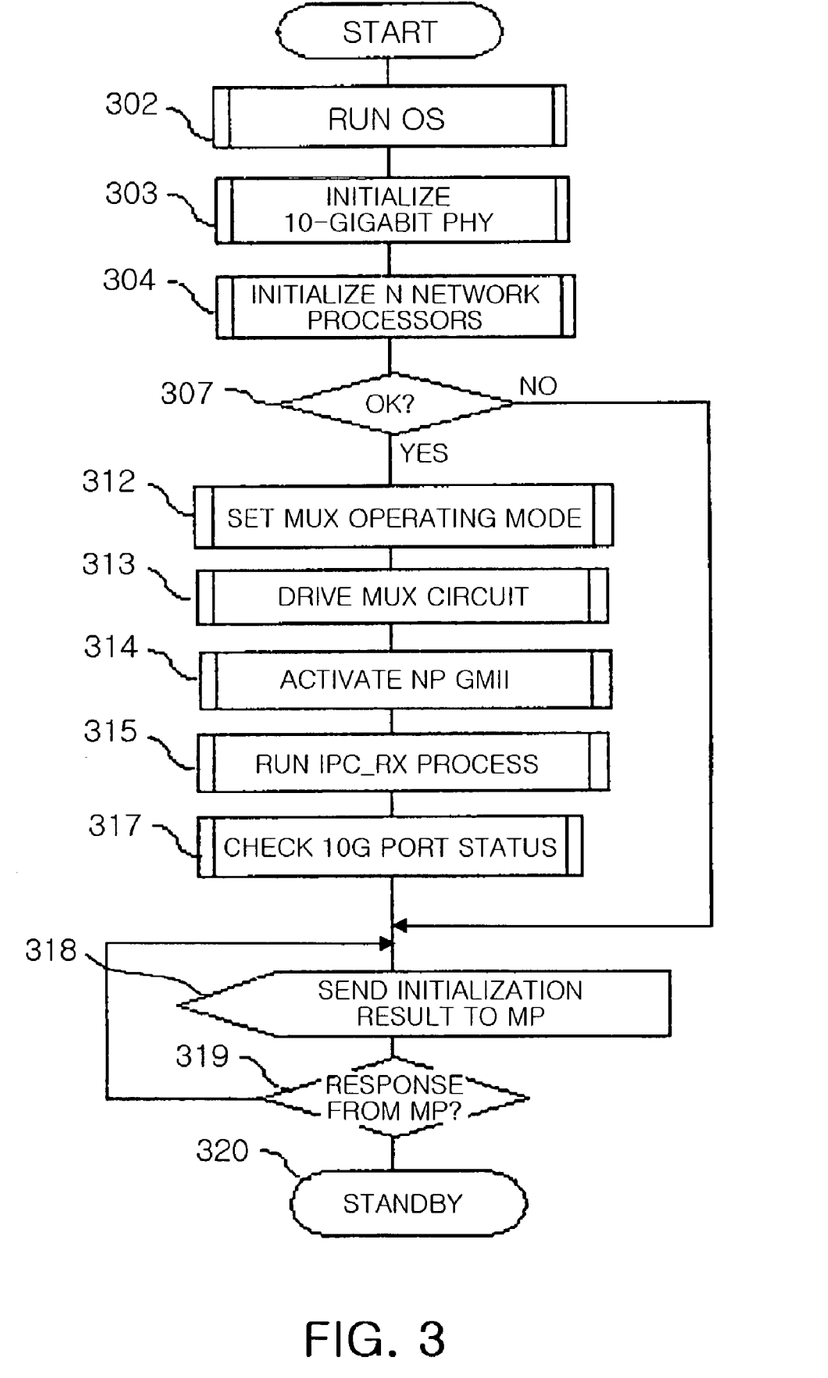
FIG. 3 is a flowchart of an activating process executed in the 10-gigabit Ethernet line interface apparatus according to the present invention.

FIG. 3 is a flowchart of an activating process executed in the 10-gigabit Ethernet line interface apparatus having the above construction.

Referring to FIG. 3, the activating process is described.

A loader, an Operating System (OS), a network processor control program, and an application program for performing L2/L3 functions are loaded into the line processor 145 of the 10-gigabit Ethernet line interface apparatus 140.

At this time, if activation or reactivation occurs by hardware or software, the OS is run to register related processes at step 302. A 10-gigabit physical layer device, comprised of the XGXS processing block 143 and the physical layer processing block 144, is initialized by the application program at step 303, and a process of initializing the N network processors 141 is executed at step 304.

In this case, the line processor 145 checks initialization results of the network processors 141 at step 307. If the initialization results are normal, the line processor 145 performs a next step, while if the initialization results are abnormal, the line processor 145 informs the main processor unit 130 of the abnormality of the initialization results at step 318.

After the initialization of the network processors 141 is normally performed, the line processor 145 sets an L2/L3 operating mode of the frame multiplexing and demultiplexing block 142 through a processor interface at step 312, and then drives the frame multiplexing and demultiplexing block 142 at step 313. After that, the line processor 145 activates n GMII interfaces between the N network processors 141 and the frame multiplexing and demultiplexing block 142 by the application program at step 314, runs an IPC reception process for receiving IPC messages from the main processor unit 130 at step 315, checks the status of the 10-gigabit port of the physical layer processing block 144 at step 317, and sends the checked result to the main processor unit 130 at step 318.

In the above process, if the line processor 145 does not receive a response to the sent initialization results from the main processor unit 130, the line processor 145 periodically sends the initialization results at regular intervals. Once the line processor 145 receives a response, the line interface apparatus 140 is switched to a standby state at steps 319 and 320.

Figure 4:
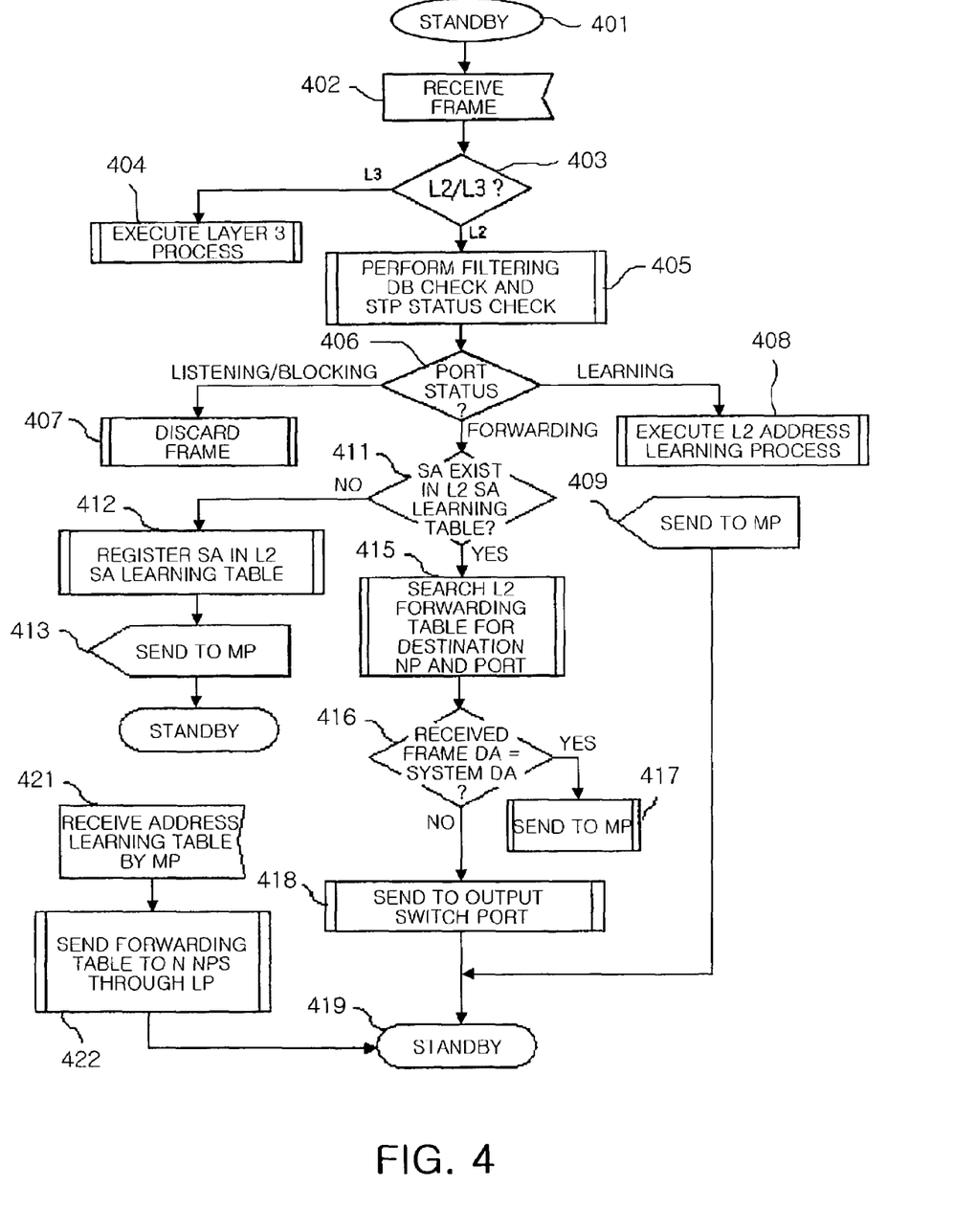
FIG. 4 is a flowchart of an L2 frame forwarding process executed in the 10-gigabit Ethernet line interface apparatus according to the present invention.

FIG. 4 is a flowchart of an L2 frame forwarding process executed in the 10-gigabit Ethernet line interface apparatus according to the present invention.

In FIG. 4, an L2 frame forwarding function is a function of finding a destination Network Processor (NP) and a destination port through an entry in which a DA MAC address of a received frame is mapped to a DA MAC address of an L2 forwarding table, converting the received frame to a fixed packet cell with switch port information attached thereto and sending the fixed packet cell to the switch fabric unit 120, or sending the received frame to the line processor 145 and transferring the received frame to the main processor unit 130 through an IPC message by the line processor 145 when the received frame is an L2 Protocol Data Unit (PDU) frame, or a DA MAC address is the same as a system MAC address.

The process of the L2 frame forwarding function is described in detail. If the line interface apparatus 140, which is in a standby state at step 401, receives an Ethernet frame at step 402, the line interface apparatus 140 checks whether a port of the received Ethernet frame is an L2 port or L3 port at step 403.

If it is checked that the port is set to an L3 port, an L3 process is executed at step 404, which will be described later.

On the contrary, if it is checked that the port of the received frame is set to an L2 port, the line interface apparatus 140 performs a filtering DB check and a Spanning Tree Protocol (STP) status check at step 405.

Next, respective processes are executed according to the status of the port of the received frame.

If the port of the received frame is in an address learning state, the line interface apparatus 140 executes an L2 address learning and aging process at step 408, so it sends an L2 address learning table to the main processor unit 130 at step 409. The main processor unit 130 receiving the L2 address learning table sends an L2 forwarding table to the N network processors 141 through the line processor 145 at step 422.

Next, if the port of the received frame is in a forwarding state, the line interface apparatus 140 checks whether a Source Address (SA) of the received frame exists in an L2 SA learning table at step 411. If the SA is not registered in the L2 SA learning table, the line interface apparatus 140 registers the new SA in the L2 SA learning table to be updated at step 412, and then sends the updated L2 SA learning table to the main processor unit 130 at step 413. On the contrary, if a SA of the received frame is registered in the L2 SA learning table, the line interface apparatus 140 searches an L2 frame forwarding table for a destination network processor and a destination port at step 415. Next, the line interface apparatus 140 compares a destination MAC address of the received frame with a destination address of the system at step 416. If the addresses are the same, the received frame is not a user data frame, so the line interface apparatus 140 sends the received frame to the line processor 145, and the line processor 145 sends the received frame to the main processor unit 130 through an IPC message at step 417. On the contrary, if the destination MAC address is different from the system destination address, the line interface apparatus 140 attaches switch labels for a destination network processor (NP) and a destination port to the received frame, and sends the received frame with the switch labels to an output switch port at step 418.

Further, if the port of the received frame is in a listening/blocking state, the received frame is discarded at step 407.

Figure 5:
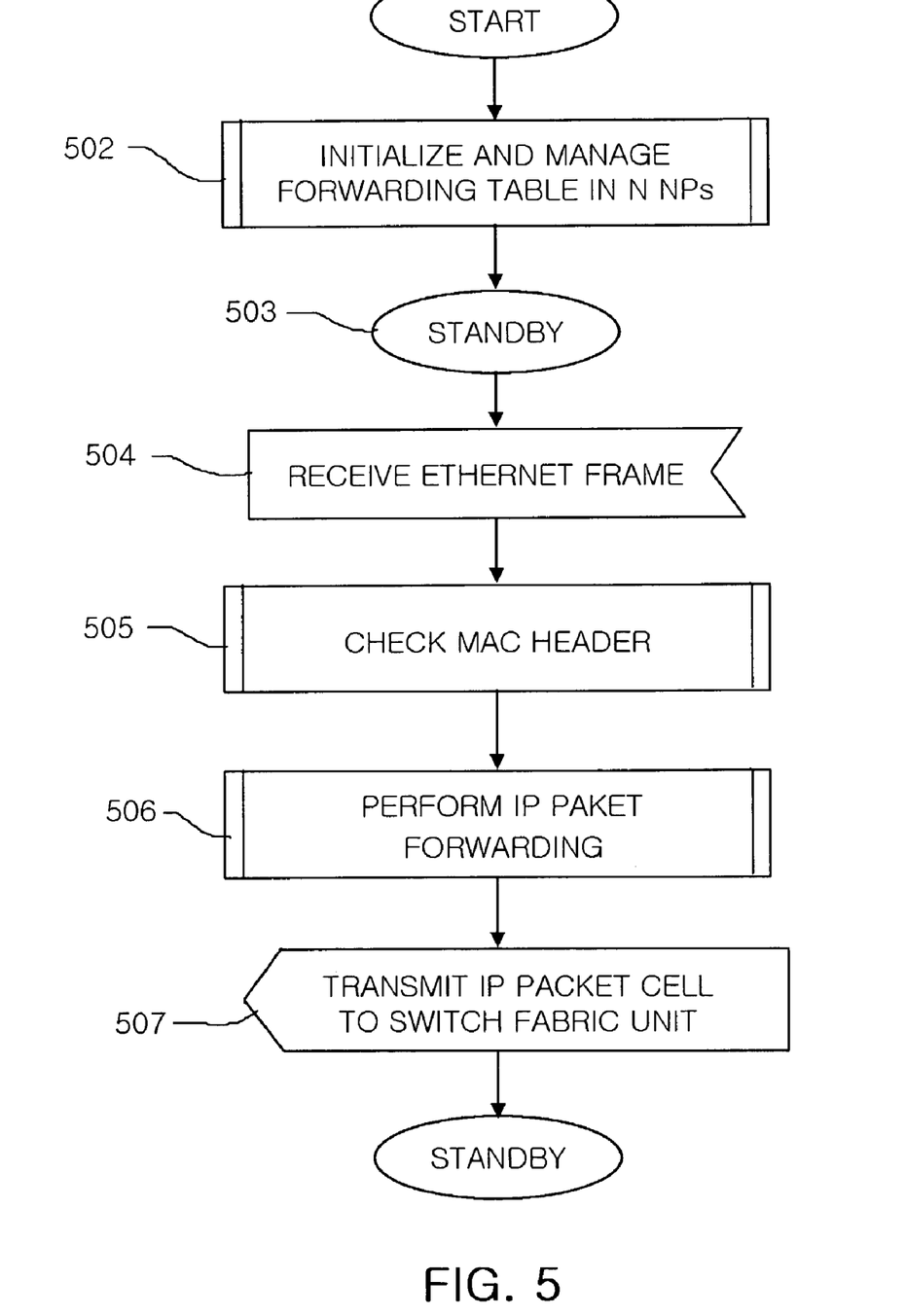
FIG. 5 is a flowchart of an IP packet forwarding process executed in the 10-gigabit Ethernet line interface apparatus according to the present invention.

FIG. 5 is a flowchart of an IP packet forwarding process executed in the 10-gigabit Ethernet line interface apparatus according to the present invention.

An IP packet forwarding function is a series of processes of finding an output port with reference to a destination IP address of a packet by an IP packet forwarding engine and transferring the packet to the output port if the packet is received by the 10-gigabit port. In this case, the 10-gigabit Ethernet line interface apparatus 140 controls the N network processors 141 to provide packet processing performance obtained by adding up the performances of the N network processors 141. At this time, IP packet forwarding tables in the N network processors 141 have the same information. Further, the main processor unit 130 sends initial forwarding table information, generated on the basis of dynamic routing information by routing protocol processing executed in the main processor unit 130 and static routing information by an operator, to the 10-gigabit Ethernet line interface apparatus 140, thus constructing initial forwarding tables to allow the N network processors 141 to perform forwarding operations.

Therefore, if routing information is varied in a routing protocol executed by the main processor unit 130, the main processor unit 130 sends the varied routing information to the line processor 145, so values stored in the forwarding tables in the N network processors 141 are updated to the same value by the line processor 145 which receives the varied routing information at step 502.

After the forwarding tables are initialized as described above, the 10-gigabit Ethernet line interface apparatus 140 stands by for frame reception at step 503. If one network processor 141 receives an Ethernet frame under the control of a standard GMII interface between the network processor 141 and the frame multiplexing and demultiplexing block 142 at step 504, the 10-gigabit Ethernet line interface apparatus 140 checks a destination MAC address (DA) in a header of the received Ethernet frame at step 505. If the destination MAC address is not a MAC address allocated to the 10-gigabit port, the received Ethernet frame is discarded, while if the addresses are the same, the Ethernet frame is sent to an internal IP forwarding engine block in one network processor 141 determined through an interface with the frame multiplexing and demultiplexing block 142 at step 506. Next, after the IP forwarding engine block of the network processor 141 performs a routing lookup for a received IP packet, it varies a corresponding destination MAC address and a Time-To-Live (TTL) value and a checksum value of an IP header, and transmits a fixed packet cell with switch port information attached thereto to the switch fabric unit 120 at step 507.

The switch fabric unit 120 checks a destination of the received packet, establishes a route to a line processor of the found output port and sends the packet via the route.

As described above, the present invention provides a 10-gigabit Ethernet line interface apparatus and method of controlling the same, which can improve transmission speed and packet processing performance of a physical layer to a 10 Gbps level while maintaining basic frame standards of a 1-gigabit Ethernet switch apparatus. As a result, the present invention is advantageous in that a LAN can be constructed as a campus network or local communication network between buildings in connection with a plurality of servers supporting 1-gigabit Ethernet ports, a plurality of Ethernet switches, and an Ethernet switch or router having a 10-gigabit Ethernet port.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A 10-gigabit Ethernet line interface apparatus, the line interface apparatus being connected to a 10-gigabit Ethernet line of a 10-gigabit Ethernet edge switch, the 10-gigabit Ethernet edge switch having 1-gigabit Ethernet line interface units connected to a plurality of 1-gigabit lines, a switch fabric unit, and a main processor unit, comprising:

a plurality of network processors for receiving and transmitting 1 gigabit Ethernet frame to the switch fabric unit and performing packet forwarding and traffic management for layer 2 switching and layer 3 routing operation;

a frame multiplexing and demultiplexing block for providing 1-gigabit Ethernet standard interfaces GMII (1-gigabit Media Independent Interface) and a 10-gigabit Ethernet standard interface XGMII (10-gigabit Media Independent Interface) between the plurality of network processors and the 10-gigabit extender sublayer processing block to multiplex a plurality of 1-gigabit Ethernet frames to a 10-gigabit Ethernet frame and demultiplex a 10-gigabit Ethernet frame to a plurality of 1-gigabit Ethernet frames according to destination address;

a 10-gigabit extender sublayer processing block connected to the frame multiplexing and demultiplexing block for supporting XGMII and XAUI (10-gigabit Attachment Unit Interface) and extending transmission distance of 10-gigabit data;

a 10-gigabit Ethernet physical layer processing block implemented by a standard package optical module to support 10-gigabit optical interfaces;

a 10-gigabit physical layer control logic for controlling the 10-gigabit extender sublayer processing logic and the 10-gigabit Ethernet physical layer processing block;

a line interface control logic for controlling the 10-gigabit Ethernet line interface apparatus; and a line processor for performing an IPC (Inter-Processor Communication) function together with the main processor unit to exchange control and status information with the main processor unit, drive the plurality of network processors, and perform forwarding table management required for Layer 2 switching and Layer 3 routing, wherein the frame multiplexing and demultiplexing block divides an internal memory into a plurality of section buffers; and the frame multiplexing and demultiplexing block is operated such that, at a time of multiplexing, it sequentially multiplexes frames received from the plurality of network processors and stored in the plurality of section buffers according to corresponding GMII ports, converts the frames to data for the XGMII standard interface, and transfers the data to the 10-gigabit Ethernet physical layer processing block, wherein the frame multiplexing and demultiplexing block is operated such that:

at a time of demultiplexing, the frame multiplexing and demultiplexing block recognizes a layer 2 (L2)/layer 3 (L3) set status of a 10-gigabit port; and if the 10-gigabit port is set to an L2 port, the frame multiplexing and demultiplexing block compares a destination address DA (t) and a source address SA (t) of a frame currently received from the 10-gigabit port with a destination address DA (t-1) and a source address SA (t-1) of a previously received frame, respectively, and stores the received frame in a reference section buffer in which the previously received (t-1) frame is stored so as to guarantee frame sequence in the case where the addresses are the same, and sequentially stores the received frame in a section buffer next to the reference section buffer in the case where the addresses are different; and the frame multiplexing and demultiplexing block calculates a frame size of every frame received by the reference section buffer from the 10-gigabit port and sequentially stores even frames, which are to be stored in the same reference section buffer, in the next section buffer so as to prevent loss of frames, if the frame size exceeds a size of an allocated section buffer.

2. A 10-gigabit Ethernet line interface apparatus, the line interface apparatus being connected to a 10-gigabit Ethernet line of a 10-gigabit Ethernet edge switch, the 10-gigabit Ethernet edge switch having 1-gigabit Ethernet line interface units connected to a plurality of 1-gigabit lines, a switch fabric unit. and a main processor unit, comprising:

a plurality of network processors for receiving and transmitting 1 gigabit Ethernet frame to the switch fabric unit and performing packet forwarding and traffic management for layer 2 switching and layer 3 routing operation;

a frame multiplexing and demultiplexing block for providing 1-gigabit Ethernet standard interfaces GMII (1-gigabit Media Independent Interface) and a 10-gigabit Ethernet standard interface XGMII (10-gigabit Media Independent Interface) between the plurality of network processors and the 10-gigabit extender sublayer processing block to multiplex a plurality of 1-gigabit Ethernet frames to a 10-gigabit Ethernet frame and demultiplex a 10-gigabit Ethernet frame to a plurality of 1-gigabit Ethernet frames according to destination address;

a 10-gigabit extender sublayer processing block connected to the frame multiplexing and demultiplexing block for supporting XGMII and XAUI (10-gigabit Attachment Unit Interface) and extending transmission distance of 10-gigabit data;

a 10-gigabit Ethernet physical layer processing block implemented by a standard package optical module to support 10-gigabit optical interfaces;

a 10-gigabit physical layer control logic for controlling the 10-gigabit extender sublayer processing logic and the 10-gigabit Ethernet physical layer processing block;

a line interface control logic for controlling the 10-gigabit Ethernet line interface apparatus; and a line processor for performing an IPC (Inter-Processor Communication) function together with the main processor unit to exchange control and status information with the main processor unit, drive the plurality of network processors, and perform forwarding table management required for Layer 2 switching and Layer 3 routing, wherein the frame multiplexing and demultiplexing block divides an internal memory into a plurality of section buffers; and the frame multiplexing and demultiplexing block is operated such that, at a time of multiplexing, it sequentially multiplexes frames received from the plurality of network processors and stored in the plurality of section buffers according to corresponding GMII ports, converts the frames to data for the XGMII standard interface, and transfers the data to the 10-gigabit Ethernet physical layer processing block, wherein the frame multiplexing and demultiplexing block is operated such that:

if the 10-gigabit port is set to an L3 port, the frame multiplexing and demultiplexing block compares a destination address DA of a frame header received from the 10-gigabit port with a MAC address SA allocated to the 10-gigabit port; and if the addresses are not the same, the frame multiplexing and demultiplexing block discards a received frame, and if the addresses are the same, the frame multiplexing and demultiplexing block compares a destination IP address DIP (t) and a source IP address SIP (t) of a current packet with a destination IP address DIP (t-1) and a source IP address SIP (t-1) of a previous packet, respectively, and stores the received packet in the same reference section buffer so as to guarantee packet sequence in the case where the IP addresses are the same, and the frame multiplexing and demultiplexing block sequentially stores the received packet in a section buffer next to the reference section buffer in the case where the IP addresses are different;

the frame multiplexing and demultiplexing block calculates an IP packet size of every IP packet received by the reference section buffer from the 10-gigabit port, and sequentially stores even packets, which are to be stored in the same reference section buffer, in the next section buffer so as to prevent loss of packets, if the IP packet size exceeds a size of an allocated section buffer; and the frame multiplexing and demultiplexing block controls n GMII interfaces so as to enable the plurality of network processors to process stored frames in parallel, if one or more frames received from the 10-gigabit port are stored in the plurality of section buffers allocated according to corresponding GMII interfaces.

* * * * *